(12) United States Patent
Lee

(10) Patent No.: US 10,908,877 B2
(45) Date of Patent: *Feb. 2, 2021

(54) MEDIAN VALUE DETERMINATION IN A DATA PROCESSING SYSTEM

(71) Applicant: Imagination Technologies Limited, Kings Langley (GB)

(72) Inventor: Timothy Lee, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/590,635

(22) Filed: Oct. 2, 2019

(65) Prior Publication Data

US 2020/0034402 A1     Jan. 30, 2020

Related U.S. Application Data

(63) Continuation of application No. 15/852,197, filed on Dec. 22, 2017, now Pat. No. 10,474,730.

(30) Foreign Application Priority Data

Dec. 23, 2016   (GB) ..................... 1622135

(51) Int. Cl.
 *G06F 7/22*       (2006.01)
 *G06F 17/18*      (2006.01)

(52) U.S. Cl.
 CPC .............. *G06F 7/22* (2013.01); *G06F 17/18* (2013.01); *G06T 2207/20032* (2013.01)

(58) Field of Classification Search
 CPC ........... G06T 2207/20032; G06F 17/10; G06F 17/18; G06F 7/22

USPC ......................... 708/202, 207, 304
See application file for complete search history.

(56) References Cited

U.S. PATENT DOCUMENTS

| 6,687,413 B2 | 2/2004 | Yushiya |
| 2004/0223659 A1 | 11/2004 | Minai |
| 2010/0161695 A1 | 6/2010 | Standfield et al. |
| 2018/0005353 A1 | 1/2018 | Kounavis |

OTHER PUBLICATIONS

Chen et al., "Design of an Area-Efficient One-Dimensional Median Filter," IEEE Transactions on Circuits and Systems-II. Express Briefs, vol. 50, No. 10, Oct. 2013.

Fahmy et al., "High-throughput One-dimensional Median and Weighted Median Filters on FPGA," IET Computers & Digital Techniques, 2009, vol. 3, Issue 4, pp. 384-394.

(Continued)

*Primary Examiner* — Matthew D Sandifer
(74) *Attorney, Agent, or Firm* — Potomac Law Group, PLLC; Vincent M DeLuca

(57) ABSTRACT

Median values for a stream of received data values in a data processing system (e.g. an image processing system) are determined. A first median value of the received data values within a first subset of data values of the received stream is determined, and intermediate data used for determining the first median value is stored. The stored intermediate data is used to determine a median value of the received data values within a second subset of data values of the received stream, wherein the second subset at least partially overlaps with the first subset. The determined median values are outputted for use in the data processing system, e.g. for further processing.

20 Claims, 10 Drawing Sheets

(56) References Cited

OTHER PUBLICATIONS

Herzog, "Efficient DSP Implementation of Median Filtering for Real-Time Audio Noise Reduction," Proc. of the 16th Int'l Conference on Digital Audio Effects, Sep. 2, 2013, pp. 1-26.
Ming, "Preserving Median Filtering Algorithm in Chip Images," The Open Electric and Electronic Engineering Journal, 2014, vol. 8, pp. 460-466.
Perreault et al., "Median Filtering in Constant Time," IEEE Transactions on Image Processing, IEEE Service Center; vol. 16; No. 9, Sep. 2007, pp. 2389-2394.
Varade et al., "A Survey on Various Median Filtering Techniques for Removal of Impulse Noise from Digital Images," Int'l Journal of Advanced Research in Computer Engineering & Technology, vol. 2, Issue 2, Feb. 2013.
Yang et al., "A Novel Fast Median Filter Algorithm Without Sorting," Proceedings of SPIE, vol. 9897; Apr. 29, 2016.
Zhao et al.,"Real-Time Median Filtering for Embedded Smart Cameras," Computer Vision Systems, ICVS 2006; IEEE International Conference on Computer Vision Systems, New York, Jan. 4 , 2006.
(*Note: copies of NPL in parent application).

|   |   | 2 | 4 | 5 | 13 | 1 | 7 | 9 | 8 | 12 |     |
|---|---|---|---|---|----|---|---|---|---|----|-----|
|   |   | A | B | C | D  | E | F | G | H | I  | Sum |
| 2 | A | - | 0 | 0 | 0  | 1 | 0 | 0 | 0 | 0  | 1   |
| 4 | B | 1 | - | 0 | 0  | 1 | 0 | 0 | 0 | 0  | 2   |
| 5 | C | 1 | 1 | - | 0  | 1 | 0 | 0 | 0 | 0  | 3   |
| 13| D | 1 | 1 | 1 | -  | 1 | 1 | 1 | 1 | 1  | 8   |
| 1 | E | 0 | 0 | 0 | 0  | - | 0 | 0 | 0 | 0  | 0   |
| 7 | F | 1 | 1 | 1 | 0  | 1 | - | 0 | 0 | 0  | 4 ← Median |
| 9 | G | 1 | 1 | 1 | 0  | 1 | 1 | - | 1 | 0  | 6   |
| 8 | H | 1 | 1 | 1 | 0  | 1 | 1 | 0 | - | 0  | 5   |
| 12| I | 1 | 1 | 1 | 0  | 1 | 1 | 1 | 1 | -  | 7   |

FIGURE 10

|   |   | 2 | 4 | 5 | 13 | 1 | 7 | 9 | 8 | 12 |     |
|---|---|---|---|---|----|---|---|---|---|----|-----|
|   |   | A | B | C | D  | E | F | G | H | I  | Sum |
| 2 | A | - | 0 | 0 | 0  | 1 | 0 | 0 | 0 | 0  | 1   |
| 4 | B |   | - | 0 | 0  | 1 | 0 | 0 | 0 | 0  | 2   |
| 5 | C |   |   | - | 0  | 1 | 0 | 0 | 0 | 0  | 3   |
| 13| D |   |   |   | -  | 1 | 1 | 1 | 1 | 1  | 8   |
| 1 | E |   |   |   |    | - | 0 | 0 | 0 | 0  | 0   |
| 7 | F |   |   |   |    |   | - | 0 | 0 | 0  | 4 ← Median |
| 9 | G |   |   |   |    |   |   | - | 1 | 0  | 6   |
| 8 | H |   |   |   |    |   |   |   | - | 0  | 5   |
| 12| I |   |   |   |    |   |   |   |   | -  | 7   |

FIGURE 11

|    |   | 10 | 2 | 11 | 13 | 1 | 7 | 9 | 8 | 12 |     |
|----|---|----|---|----|----|---|---|---|---|----|-----|
|    |   | J  | K | L  | D  | E | F | G | H | I  | Sum |
| 10 | J | -  | 1 | 0  | 0  | 1 | 1 | 1 | 1 | 0  | 5   |
| 2  | K |    | - | 0  | 0  | 1 | 0 | 0 | 0 | 0  | 1   |
| 11 | L |    |   | -  | 0  | 1 | 1 | 1 | 1 | 0  | 6   |
| 13 | D |    |   |    | -  | 1 | 1 | 1 | 1 | 1  | 8   |
| 1  | E |    |   |    |    | - | 0 | 0 | 0 | 0  | 0   |
| 7  | F |    |   |    |    |   | - | 0 | 0 | 0  | 2   |
| 9  | G |    |   |    |    |   |   | - | 1 | 0  | 4  ← Median |
| 8  | H |    |   |    |    |   |   |   | - | 0  | 3   |
| 12 | I |    |   |    |    |   |   |   |   | -  | 7   |

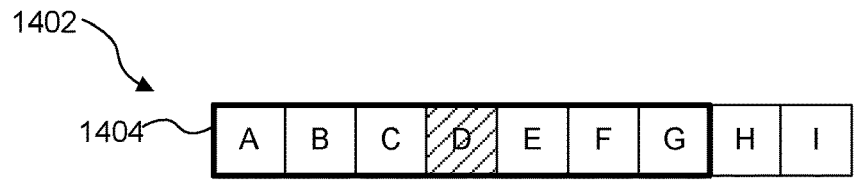
FIGURE 14a
FIGURE 14b
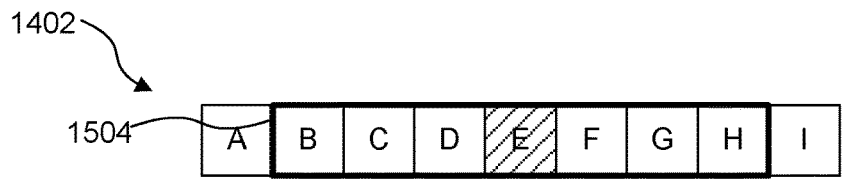
FIGURE 15a
FIGURE 15b

|   |   | 10 | 4 | 5 | 13 | 1 | 7 | 9 | 8 | 12 |
|---|---|----|---|---|----|---|---|---|---|----|
|   |   | J  | B | C | D  | E | F | G | H | I  |
| 2 | A | -  | 0 | 0 | 0  | 1 | 0 | 0 | 0 | 0  |
| 10| J | -  | 1 | 1 | 0  | 1 | 1 | 1 | 1 | 0  |
| Previous sum | |   | 2 | 3 | 8 | 0 | 4 | 6 | 5 | 7 |
| Updatedsum | |  6 | 1 | 2 | 8 | 0 | 3 | 5 | 4 | 7 |

FIGURE 16a

|   |   | 10 | 2 | 5 | 13 | 1 | 7 | 9 | 8 | 12 |
|---|---|----|---|---|----|---|---|---|---|----|
|   |   | J  | K | C | D  | E | F | G | H | I  |
| 4 | B | 0  | - | 0 | 0  | 1 | 0 | 0 | 0 | 0  |
| 2 | K | 0  | - | 0 | 0  | 1 | 0 | 0 | 0 | 0  |
| Previous sum | | 6 |  | 2 | 8 | 0 | 3 | 5 | 4 | 7 |
| Updatedsum | | 6 | 1 | 2 | 8 | 0 | 3 | 5 | 4 | 7 |

FIGURE 16b

|   |   | 10 | 2 | 11 | 13 | 1 | 7 | 9 | 8 | 12 |
|---|---|----|---|----|----|---|---|---|---|----|
|   |   | J  | K | L  | D  | E | F | G | H | I  |
| 5 | C | 0  | 1 | -  | 0  | 1 | 0 | 0 | 0 | 0  |
| 11| L | 1  | 1 | -  | 0  | 1 | 1 | 1 | 1 | 0  |
| Previous sum | | 6 | 1 |   | 8 | 0 | 3 | 5 | 4 | 7 |
| Updatedsum | | 5 | 1 | 6 | 8 | 0 | 2 | 4 | 3 | 7 |

↑ Median (under column G)

FIGURE 16c

MEDIAN VALUE DETERMINATION IN A DATA PROCESSING SYSTEM

CROSS-REFERENCE TO RELATED APPLICATIONS AND CLAIM OF PRIORITY

This application is a continuation under 35 U.S.C. 120 of copending application Ser. No. 15/852,197 filed Dec. 22, 2017, which claims foreign priority under 35 U.S.C. 119 from United Kingdom Application No. 1622135.0 filed Dec. 23, 2016.

BACKGROUND

There are many different types of data processing systems which include functionality for determining the median value from a group of data values. Examples of such data processing systems include image processing systems, audio processing systems and signal processing systems to give just a few examples. For example, an image processing system may be used in a camera pipeline to process pixel values originating from image sensors in a camera to provide a set of processed pixel values representing a captured image. A median determination may be performed for many different purposes, e.g. to implement a median filter for attenuating impulsive noise (i.e. denoising), for defective pixel detection, or defective pixel correction to give just some examples.

The number (n) of data values from which a median value is to be found may be different in different implementations. If an input set of data values from which the median is to be found is small, e.g. where n=3 or n=5, then finding the median value is trivial. In a general solution, the n data values are sorted into order and then the middle value is chosen as the median value.

Algorithms for sorting a set of data values tend to use recursion, which is suitable for being implemented in software. As the number of data values in the set increases, the complexity involved in sorting the data values in software typically scales by a factor of (n log n). However, algorithms using recursion are not well suited for being implemented in hardware. Modules of some data processing systems are implemented in hardware (e.g. fixed function circuitry) rather than being implemented in software running on general purpose hardware, because hardware implementations can provide a more optimised system (e.g. in terms of processing latency, power consumption and the physical size of the processing system e.g. when implemented in silicon) for performing a specific function. Therefore, if a data processing system is intended to operate quickly (e.g. for processing and outputting data in real-time), and/or in a device with limited battery life (e.g. a mobile device such as a smartphone, tablet, camera, laptop, etc.), and/or on a System On Chip (SOC) which has constraints on its physical size (e.g. for use in mobile devices) then a hardware implementation of the data processing system is often implemented. One example of a data processing system which tends to be implemented in hardware is an image processing system used in a camera pipeline for processing pixel values received from an image sensor for providing processed pixel values to be captured and/or displayed to a user in real-time, e.g. on the screen of a tablet, smartphone or handheld camera etc.

One method for implementing a median determining unit in hardware is to use a Bubble sort algorithm. According to the Bubble sort algorithm (which may be referred to as a "sinking sort") comparisons between two of the data values are repeatedly performed to compare each pair of adjacent data values in turn and swap them if they are in the wrong order. The pass through the data values is repeated until no swaps are needed, which indicates that the data values are sorted into the correct order.

FIG. 1 shows an example in which five data values are sorted using the Bubble sort algorithm. The horizontal axis in FIG. 1 represents units of time, e.g. clock cycles or processing cycles. For example, a unit of time may be the time taken to perform a compare and swap operation. The time to do a compare increases with the number of bits in the operands being compared, e.g. it takes longer to compare two 12-bit values than to compare two 5-bit values. The horizontal lines A to E represent positions between which data values may move as the sort process progresses. The way in which data values are represented at particular positions and times depends on how the sorter is implemented. For example, data values may be stored in registers, or may exist as signals in logic units. At the beginning of the sort process the values in positions A to E are unsorted, and at the end of the sort process the values will be sorted, e.g. with the largest value in position A and the smallest value in position E. In FIG. 1, thick vertical lines between two positions, e.g. as represented with reference numeral 102, indicate compare and swap operations, which may be implemented by a piece of dedicated hardware connected between the two positions at which data values are to be compared and optionally swapped. At time instance 1, the data values in positions A and B are compared, and if the data value in position B is greater than the data value in position A then the data values are swapped in positions A and B, otherwise the data values in positions A and B are not swapped in time instance 1. At time instance 2 the data values in positions B and C are compared and if the data value in position C is greater than the data value in position B then the data values are swapped in positions B and C, otherwise the data values in positions B and C are not swapped in time instance 2. At time instance 3 the data values in positions C and D are compared and if the data value in position D is greater than the data value in position C then the data values are swapped in positions C and D, otherwise the data values in positions C and D are not swapped in time instance 3. At time instance 4 the data values in positions D and E are compared and if the data value in position E is greater than the data value in position D then the data values are swapped in positions D and E, otherwise the data values in positions D and E are not swapped in time instance 4. Therefore, following time instance 4, the smallest data value will be in position E. The compare and swap operations are repeated as illustrated in FIG. 1, such that following time instance 7, the second smallest data value will be in position D; following time instance 9, the third smallest data value will be in position C; and following time instance 10, the largest data value will be in position A and the second largest data value will be in position B. Therefore, after time instance 10, the data values are sorted into the correct order in position A to E. After the sorting process, the median value is the data value stored in the middle position, i.e. in position C. In the simple example shown in FIG. 1, with five inputs (i.e. n=5), there are ten comparisons and the sort takes ten units of time to complete. In general, if the approach shown in FIG. 1 is used for n inputs, the number of comparisons that are performed is given by $\frac{1}{2}n(n-1)$, and the number of units of time that the sort takes is also given by $\frac{1}{2}n(n-1)$.

The example shown in FIG. 1 is conceptually simple to understand, but the efficiency of the sorting algorithm can be improved, in terms of the time taken to perform the search.

FIG. 2 shows an example in which multiple comparisons can be performed at the same time instance on different pairings of positions. For example, at time instance 3, the data values in positions A and B are compared and optionally swapped, at the same time that the data values in positions C and D are compared and optionally swapped. In the example shown in FIG. 1, the data values in positions A and B do not change at time instances 3 and 4, so the comparison that is performed at time instance 5 in FIG. 1, can be implemented at time instance 3 in the example shown in FIG. 2, without effecting the outcome of the sorting process. The same reasoning applies to explain how the other compare operations shown in FIG. 1 can be compressed into the seven time units as shown in FIG. 2. In the example shown in FIG. 2, with five inputs (i.e. n=5), there are ten comparisons and the sort takes seven units of time to complete. In general, if the approach shown in FIG. 2 is used for n inputs, the number of comparisons that are performed is given by $\frac{1}{2}n(n-1)$, and the number of units of time that the sort takes is given by $2n-3$.

It can be shown that the compare operations can be compressed even further, as shown in FIG. 3, such that with five inputs (i.e. n=5), the sort takes five units of time to complete. There are still ten comparisons in the example shown in FIG. 3. In general, if the approach shown in FIG. 3 is used for n inputs, the number of comparisons that are performed is given by $\frac{1}{2}n(n-1)$, and the sort takes n units of time to complete.

FIG. 4 shows how the same approach as that shown in FIG. 3 can be applied to the case of 7 inputs. In this example, 21 comparisons are performed and the sort takes 7 units of time to complete. The example shown in FIG. 4 is a simplification, and in a real system one or more retiming stages may be required between some of the time instances at which comparisons are performed, so that the signals can be safely swapped between positions before the values in those positions are subsequently used in further comparisons. In other words, there may be propagation delays when data values are swapped between positions, so latency may be added to the sort process to account for the propagation delays. For example, the number of sequential transistors on the worst case path through the logic (i.e. the "logic depth") determines the minimum amount of time that can be safely allowed to the circuit for it to operate correctly. An n-bit compare takes o(n) transistor times, but this can be improved at the cost of faster but less area-efficient logic. In current technology, the logic depth should not exceed approximately 30, else it becomes very difficult to achieve layout. This maps into approximately three compare and swap operations before it becomes necessary to add registers, and stall the result by a clock cycle. Therefore, the sort shown in FIG. 4 may take longer than seven units of time to complete in a real system. It is noted that extra additional registers cost both area and power.

FIG. 5 shows how the same approach as that shown in FIG. 3 can be applied to the case of 9 inputs. In this example, 36 comparisons are performed and the sort takes 9 units of time to complete, plus some time to allow for the propagation delays, as described above.

Each comparison and swap that is performed consumes power. Furthermore, when the algorithm is implemented in fixed function hardware, each comparison that is performed is implemented with a block of hardware implementing the comparison and optional swap functionality. The routing of the correct signals to the different comparison blocks can become complicated when the number of comparisons increases. Therefore, for a multitude of reasons (e.g. to reduce the size of the hardware and to reduce the power consumption of the hardware), it can be beneficial to reduce the number of comparisons that are performed. If the hardware is used to determine a median value, but not used to perform a full sort of all of the input values, then some of the comparisons might not need to be implemented in some of the examples described above. For example, in FIG. 3, one of the comparisons is shown with a dashed line, rather than a solid line, to indicate that this comparison does not need to be implemented in order to determine the median value. In FIG. 4, three of the comparisons are shown with dashed lines, rather than solid lines, to indicate that these comparisons do not need to be implemented in order to determine the median value. It should be apparent that these comparisons will not affect the data value which is found to be the median value. Therefore, these three comparisons might not be implemented in order to reduce the number of comparisons. Similarly, in FIG. 5, six of the comparisons are shown with dashed lines, rather than solid lines, to indicate that these comparisons do not need to be implemented. It should be apparent that these comparisons will not affect the data value which is found to be the median value. Therefore, these six comparisons might not be implemented in order to reduce the number of comparisons.

The Bubble sort algorithm is simple, but it is slow to perform and involves the implementation of a large number of comparisons, particularly when the number of inputs increases, e.g. above n=9. The same issues apply with other known sorting techniques such as an insertion sort. In both a bubble sort technique and an insertion sort technique the number of compare&swap units scales on the order of $n^2$, and the time taken to perform the sort scales on the order of n, plus extra retiming stages which are required approximately $n/3$ times.

Typically in a data processing system, such as an image processing system for use in a camera pipeline, the number of inputs to a median determining unit can be greater than nine. For example, a typical operation in a camera pipeline (e.g. denoising or defective pixel detection/correction) may be performed for each particular pixel within an image being processed, and may involve finding the median of the pixel values within a block of pixel values including (e.g. centred on) the particular pixel. The block of pixel values may for example be a 3×3 block, a 5×5 block, a 7×7 block, a 3×5 block, a 5×7 block, a 7×9 block or a 9×9 block to give just some examples. For some functions, a 3×3 block of pixel values is simply too small to provide acceptable image processing results. Obviously, a 5×5 block of pixel values includes 25 pixel values and a 7×7 block of pixel values includes 49 pixel values. Algorithms such as the bubble sort and the insertion sort are not suitable to be implemented in hardware for use in finding the median of such a large number of inputs. For example, with 25 inputs, (i.e. n=25) a bubble sort algorithm would include 300 comparisons and the sort would take 25 units of time to complete, plus additional time and logic to allow for the propagation delays, as described above. With 49 inputs, (i.e. n=49) a bubble sort algorithm would include 1176 comparisons and the sort would take 49 units of time to complete, plus additional time and logic to allow for the propagation delays, as described above.

Therefore, the bubble sort algorithm and the insertion sort algorithm are not suitable for use in an image processing system (e.g. for use in a camera pipeline) which must process data values for output in real-time and for which the size and power consumption of the hardware are important considerations. With the current state of the art, it is difficult to implement a median determining unit in hardware that can provide results for use in real-time processing with acceptable power consumption and silicon area for a set of more than eleven data values.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to embodiments described herein, a stream of data values (e.g. pixel or audio values) is processed to determine a respective median value for each of a plurality of the data values in the stream. It has been appreciated that the subset of data values which are processed when determining a median value for a particular data value in the stream will at least partially overlap with the subset of data values which are processed when determining a median value for another (e.g. the next) data value in the stream. Therefore, some information (referred to herein as "intermediate data") used for determining the median for one data value in the stream can be used for determining the median for the next data value in the stream. In other words, information from processing a current data value in the stream (e.g. for determining a median value) can be used to simplify the task of processing the next data value in the stream (e.g. for determining a median value). In this way, the processing can be shared between consecutive data values in the stream for determining the median values for the data values. This is in contrast to the prior art in which each median value for each data value in the stream is determined separately.

This allows embodiments described herein to reduce the complexity (e.g. the number of comparisons) to scale on the order of n (as compared to $n^2$ as described above for the bubble sort technique) and the time taken, or "latency", to scale on the order(1) (as compared to n as described above for the bubble sort technique). This can lead to huge reductions in the physical size (e.g. silicon area) of the hardware and in the power consumption of a median determining unit.

Embodiments described herein relate to a method of determining median values in a data processing system (e.g. an image processing system), in which a stream of data values is received. A first median value of the received data values within a first window (or "subset of data values") of the received stream is determined, and intermediate data used for determining the first median value is stored. The stored intermediate data is used to determine a median value of the received data values within a second window of the received stream, wherein the second window at least partially overlaps with the first window. The determined median values are outputted for use in the data processing system, e.g. for further processing.

In particular, there is provided a median determining unit for use in a data processing system which processes a stream of data values, wherein the median determining unit is configured to receive data values of the stream, the median determining unit comprising:
  data storage logic configured to store intermediate data for use in determining median values; and
  processing logic configured to:
    determine intermediate data for use in determining a median value of a first subset of the received data values of the stream, and to cause the determined intermediate data to be stored in the data storage logic;
    determine a median value of the received data values within the first subset using the determined intermediate data; and
    for each of at least one further subset of the received data values of the stream:
      retrieve the intermediate data determined for a previous subset of data values from the data storage logic;
      use the retrieved intermediate data for the previous subset of data values to determine intermediate data for use in determining a median value of the current subset of received data values of the stream, wherein the current subset of data values at least partially overlaps with the previous subset of data values;
      cause the determined intermediate data for the current subset of data values to be stored in the data storage logic; and
      determine a median value of the received data values within the current subset using the determined intermediate data for the current subset;
  wherein the median determining unit is further configured to output the determined median values for use in the data processing system.

There is provided a median determining unit for use in a data processing system which processes a stream of data values, wherein the median determining unit is configured to receive data values of the stream, and wherein the median determining unit comprises:
  processing logic configured to determine a median value of a first subset of the received data values of the stream; and
  data storage logic configured to store intermediate data used for determining the median value of the first subset of the received data values;
  wherein the processing logic is further configured to use the stored intermediate data to determine a median value of a second subset of the received data values of the stream, wherein the second subset of data values at least partially overlaps with the first subset of data values; and
  wherein the median determining unit is further configured to output the determined median values for use in the data processing system.

The intermediate data for a subset of data values may comprise, for each pairing of data values within the subset, an indication (e.g. a single bit flag) of which of the data values of the pairing is greater. For example, the processing logic may comprise a plurality of comparison modules configured to determine a respective plurality of the indications for pairings involving one or more data values of the current subset which do not overlap with the previous subset. The processing logic may be configured to replace the indications for pairings involving one or more data values of the previous subset which do not overlap with the current subset of data values with the plurality of indications determined by the plurality of comparison modules for the pairings involving one or more data values of the current subset which do not overlap with the previous subset.

The processing logic may be configured to, if more than one data value of the current subset does not overlap with the previous subset, determine the plurality of indications in multiple phases, wherein in each of the phases, a single one of the data values of the current subset which does not overlap with the previous subset replaces one of the data values of the previous subset which does not overlap with the current subset.

The processing logic may be configured to add a different sub-reference to each data value in the subset. For example, the sub-reference added to each data value in the subset may be dependent upon the position of that data value in the stream. As another example, the sub-reference added to each data value in the subset may be based on the row number for that data value within a table of the indications.

The processing logic may be configured to determine a median value of the data values within a subset of data values by: for each respective data value within the subset, determining the result of a sum based on indications for the pairings involving the respective data value to thereby determine an indication of the number of other data values in the subset that the respective data value is greater than; and selecting, based on the determined results of the sums, one of the data values in the subset, thereby determining the median value of the data values within the subset.

The intermediate data for a subset of data values may comprise, for each of the data values in the subset, an index value indicating a sorted position of the data value within the subset. The processing logic may be configured to determine a median value of the data values within a subset of data values by selecting one of the data values in the subset based on the index values. For example, the processing logic may be configured to use the retrieved intermediate data for the previous subset of data values to determine intermediate data for use in determining a median value of the current subset of received data values of the stream by: identifying index values of one or more data values of the previous subset which overlap with the current subset of data values; for each of one or more data values of the current subset which overlap with the previous subset, determining whether or not to increment or decrement the index value for the data value based on: (i) a comparison of the data value with the one or more data values of the previous subset which do not overlap with the current subset, and (ii) a comparison of the data value with the one or more data values of the current subset which do not overlap with the previous subset; and identifying one or more index values to be assigned to the one or more data values of the current subset which do not overlap with the previous subset by finding gaps in the sequence of index values of the data values in the current subset, such that the index values in the current subset form a contiguous sequence.

The stream of data values may represent a two-dimensional array of data values. Each of the subsets of data values within the stream of data values may represent a contiguous block of data values within the two-dimensional array. To give some examples, the subsets of data values may represent one of: 5×5 blocks of data values, 7×7 blocks of data values, 3×5 blocks of data values, 5×7 blocks of data values, 7×9 blocks of data values or 9×9 blocks of data values.

The data processing system may be an image processing system, and the data values may be pixel values. For example, the pixel values may originate from an image sensor. The data processing system may be configured to receive lines of pixel values, and the data processing system may comprise a line store module configured to store lines of pixel values such that the subsets of pixel values can span over more than one line. For example, the lines of pixel values may be rows of pixel values, and the data processing system may be configured to receive the stream of pixel values according to a raster scan order, wherein the subsets of pixel values may represent blocks of pixel values within the two dimensional array which are wider than they are tall.

In some examples, the stream of data values may represent a one-dimensional array of data values. Each of the subsets of data values within the stream of data values may represent a contiguous block of data values within the one-dimensional array. For example, the data processing system may be an audio processing system, and the data values may be audio samples of an audio signal. As another example, the data processing system may be a signal processing system, and the data values may be signal samples of a transmitted signal.

There may be provided a data processing system configured to process a stream of data values, wherein the data processing system comprises a median determining unit as described herein.

There is provided a method of determining median values in a data processing system which processes a stream of data values, the method comprising:
  receiving data values of the stream;
  determining and storing intermediate data for use in determining a median value of a first subset of the received data values of the stream;
  determining a median value of the received data values within the first subset using the determined intermediate data; and
  for each of at least one further subset of the received data values of the stream:
    using the stored intermediate data determined for a previous subset of data values to determine intermediate data for use in determining a median value of the current subset of received data values of the stream, wherein the current subset of data values at least partially overlaps with the previous subset of data values;
    storing the determined intermediate data for the current subset of data values; and
    determining a median value of the received data values within the current subset using the determined intermediate data for the current subset;
  the method further comprising outputting the determined median values for use in the data processing system.

There is provided a method of determining median values in a data processing system which processes a stream of data values, the method comprising:
  receiving data values of the stream;
  determining a median value of a first subset of the received data values of the stream;
  storing intermediate data used for determining the median value of the first subset of the received data values;
  using the stored intermediate data to determine a median value of a second subset of the received data values of the stream, wherein the second subset of data values at least partially overlaps with the first subset of data values; and
  outputting the determined median values for use in the data processing system.

The median determining unit may be embodied in hardware on an integrated circuit. There may be provided a method of manufacturing, at an integrated circuit manufacturing system, a median determining unit, e.g. as part of a data processing system. There may be provided an integrated circuit definition dataset that, when processed in an integrated circuit manufacturing system, configures the system to manufacture a median determining unit. There may be provided a non-transitory computer readable storage medium having stored thereon a computer readable description of an integrated circuit that, when processed, causes a layout processing system to generate a circuit layout description used in an integrated circuit manufacturing system to manufacture a median determining unit.

There may be provided an integrated circuit manufacturing system comprising:
a non-transitory computer readable storage medium having stored thereon a computer readable integrated circuit description that describes the median determining unit, e.g. as part of a data processing system;
a layout processing system configured to process the integrated circuit description so as to generate a circuit layout description of an integrated circuit embodying the median determining unit; and
an integrated circuit generation system configured to manufacture the median determining unit according to the circuit layout description.

Although methods described herein are best suited to being implemented in dedicated hardware, the methods could be implemented in software running on general purpose hardware. Therefore, there may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 10 shows a first example of intermediate data which can be used for determining the median value for the first data value in the 2D array;

FIG. 11 shows a second example of intermediate data which can be used for determining the median value for the first data value in the 2D array;

FIG. 14a shows a 1D array of data values, highlighting the data values which will be used for determining the median value for a first data value in the 1D array;

FIG. 14b shows an example of intermediate data which can be used for determining the median value for the first data value in the 1D array;

FIG. 15a shows a 1D array of data values, highlighting the data values which will be used for determining the median value for a second data value in the 1D array;

FIG. 15b shows an example of intermediate data which can be used for determining the median value for the second data value in the 1D array;

FIG. 16a illustrates a first phase of updating indices of data values in which data value J replaces data value A;

FIG. 16b illustrates a second phase of updating indices of data values in which data value K replaces data value B;

FIG. 16c illustrates a third phase of updating indices of data values in which data value L replaces data value C.

Figure 1:
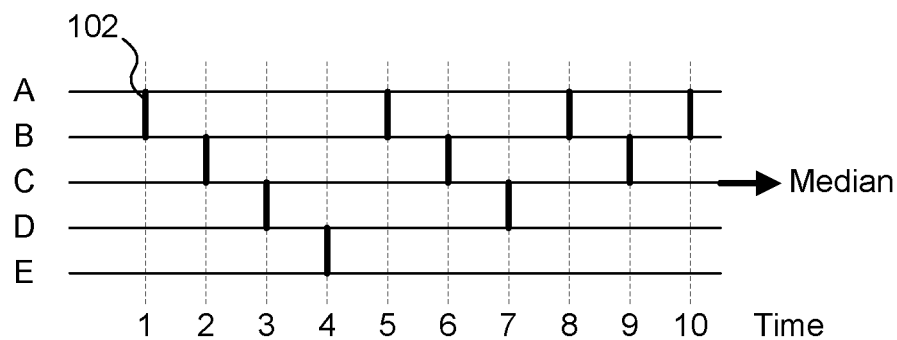
FIG. 1 shows a first example implementation of a bubble sort algorithm operating on five inputs.
Figure 2:
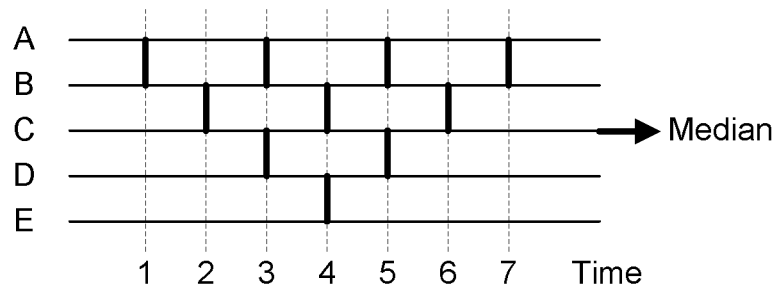
FIG. 2 shows a second example implementation of a bubble sort algorithm operating on five inputs.
Figure 3:
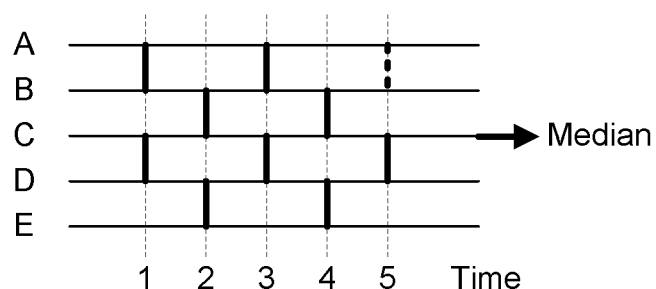
FIG. 3 shows a third example implementation of a bubble sort algorithm operating on five inputs.
Figure 4:
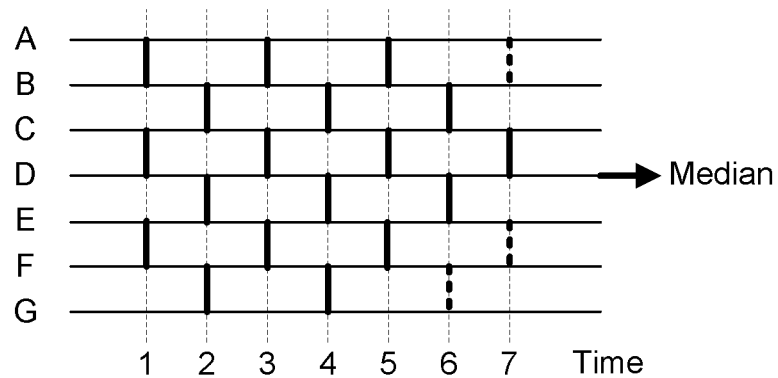
FIG. 4 shows an example implementation of a bubble sort algorithm operating on seven inputs.
Figure 5:
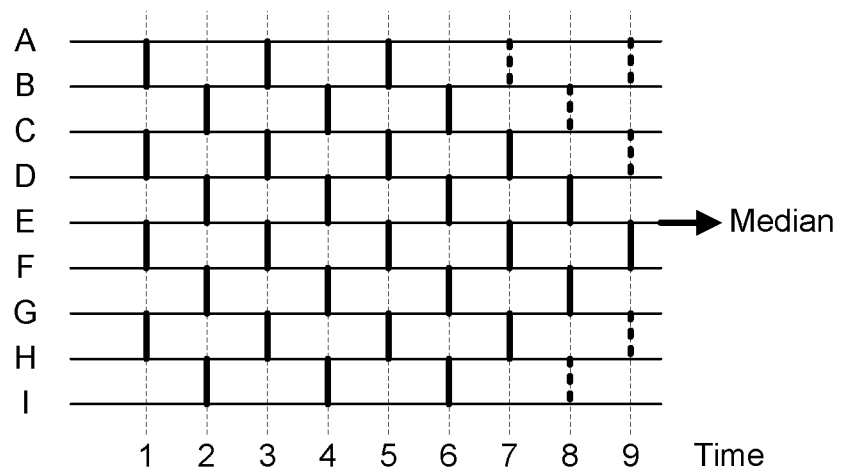
FIG. 5 shows an example implementation of a bubble sort algorithm operating on nine inputs.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Examples described herein, e.g. with reference to FIG. 10 and described in detail below, use a 'compare and count' algorithm rather than a 'compare and swap' algorithm as described in the background section above. In a compare and count method, each input value is compared with all the other input values and a count of the number of other input values that a particular input value is greater than is recorded. The median of the input values will have a count of $\frac{1}{2}(n-1)$. Compare and count implementations consume less power than compare and swap implementations because no swapping of data values is necessary, and swap operations consume power.

Figure 6:
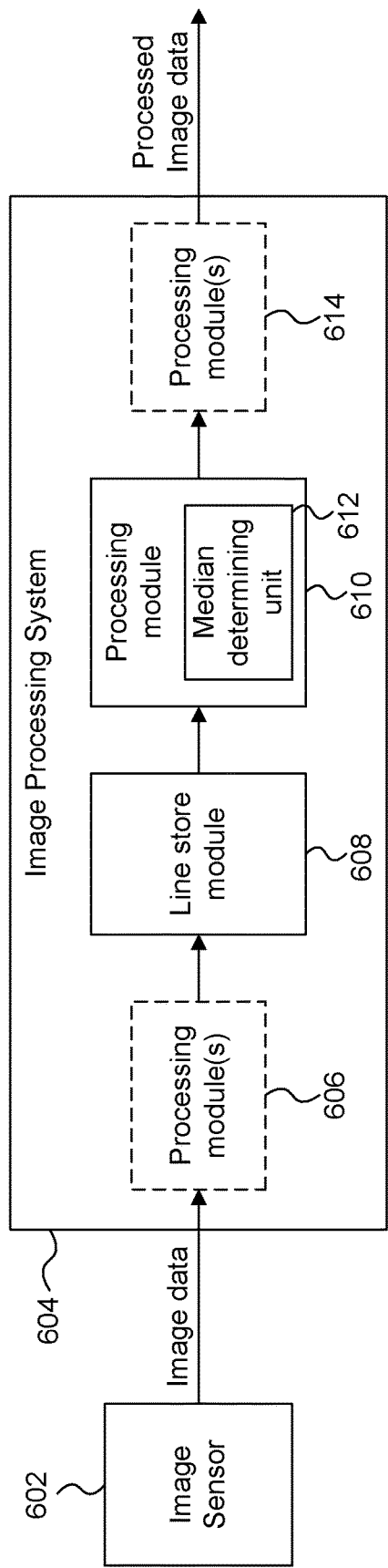
FIG. 6 shows an image processing system.

This disclosure provides a description of a median determining unit which can be implemented in any suitable data processing system which processes a stream of data values for which median values are to be determined. FIG. 6 shows an example in which the data processing system is an image processing system, but it is to be understood that the median determining unit could be implemented in other types of data processing system, such as an audio processing system or a signal processing system to give just two examples.

FIG. 6 shows a system including an image sensor 602 and an image processing system 604. The image processing system 604 could be described as a camera processing pipeline. The system shown in FIG. 6 may be implemented in a device, such as a camera. The image sensor 602 is configured to capture image data (e.g. pixel values) and provide the image data to the image processing system 604. In some examples, the image sensor 602 may capture a sequence of images, which can be used to represent frames of a video sequence. The image data may be in one of many different possible formats, for example the pixel values may comprise Red, Green or Blue (RGB) values to represent the intensity of the respective three colour channels at the respective pixel positions. The image sensor 602 may provide the pixel values to the image processing system 604 in a raster scan order, such that pixel values for lines of pixels (e.g. rows of pixels) are received and processed in the image processing system 604 as they are received from the image sensor 602 in real-time.

The image processing system 604 may comprise a number of processing modules 606, 610 and 614 for applying respective processing functions to the image data. The processing modules may, for example, be implemented in dedicated hardware modules (e.g. in fixed function circuitry) such that they can be optimised for performing specific processing functions on the pixel values in an efficient manner (e.g. efficient in terms of at least one of latency, power consumption and silicon area). The processing module(s) 606 and 614 are represented with dashed boxes because the number of these modules may vary in different implementations and that number may be zero in some implementations. The processing module(s) 606 and 614 may perform any suitable functions on pixel values, e.g. adjusting gains of the pixel values, adjusting the white balance of the pixel values, filtering of pixel values, etc. If a processing module requires access to pixel values from more than one line of the image (e.g. a 2D filtering module) then a line store module (or "line store bank") can be implemented in the image processing system 604 prior to the processing module. For example, processing module 610 requires access to multiple rows of pixel values, e.g. the processing module 610 may be configured to implement a 2D filtering process or defective pixel detection or defective pixel correction. In these types of processes, a particular pixel value can be processed based on the pixel values within a kernel of pixel values including the particular pixel value (e.g. centred on the particular pixel value). In particular, the processing module 610 includes a median determining unit 612 configured to determine median values for pixel values. The line store module 608 is implemented to store pixel values for multiple lines of pixels and can provide pixel values from multiple lines to the processing module 610. Processed image data is output from the image processing system 604, and may be used in any suitable manner, e.g. output to a display, stored in memory, etc.

Figure 7:
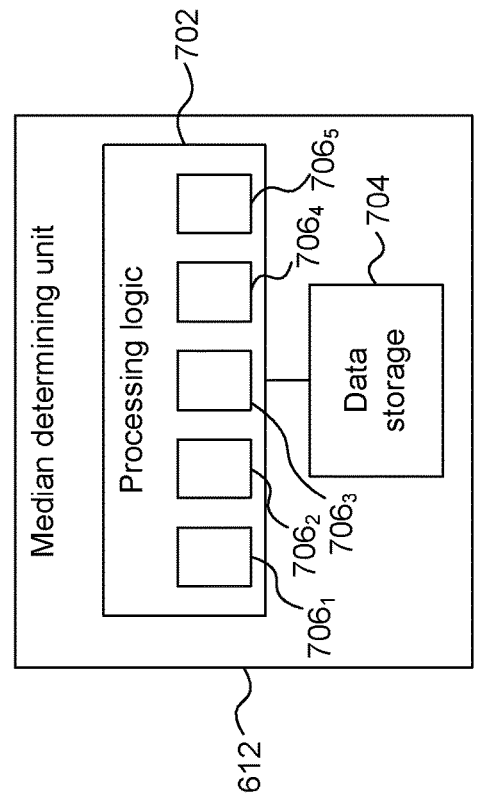
FIG. 7 shows a median determining unit.

FIG. 7 shows some of the components within the median determining unit 612. In particular, the median determining unit 612 comprises processing logic 702 and data storage logic 704. The processing logic 702 comprises a plurality of comparison modules 706 which are configured to compare two input data values to determine which is greater. The data storage logic 704 is configured to store intermediate data for use in determining median values, as explained in more detail below. The median determining unit 612 may be implemented in hardware, software, firmware or any combination thereof. In an example described in detail herein, the median determining unit 612 is implemented in hardware. In particular the median determining unit 612 is implemented using fixed function circuitry such that it operates as described herein. Therefore, the median determining unit 612 is configured specifically for the purpose it is to be used for, e.g. it is configured to receive a particular number of data values and determine a median value from a set of data values having a particular number of data values. A fixed function hardware implementation allows the median determining unit to be optimised for performing a specific task efficiently (e.g. in terms of latency, power consumption and silicon area), at the cost of inflexibility of operation. In the simple example shown in FIG. 7, the processing logic 702 includes five comparison modules $706_1$ to $706_5$ because it is configured to compare five different pairings of input data values, but in other examples, the processing logic 702 may include a different number of comparison modules. If a more flexible median determining unit is desired then a software implementation could be used such that the number of inputs and the number of data values within a set for which a median value is to be determined could be altered after the manufacture of the median determining unit, e.g. during runtime. In some examples, the processing module 610 consists entirely of the median determining unit 612, but in some other examples, the processing module 610 may include other functionality which makes use of median values determined by the median determining unit 612.

Operation of the image processing system 604 is described with reference to the flow chart shown in FIG. 8. The image sensor 602 captures image data, e.g. pixel intensity values for different pixels within an image. Techniques for capturing these pixel intensity values at the image sensors are known in the art and the details of this process are beyond the scope of this description. In step S802 the image processing system 604 receives a stream of data values from the image sensor 602. The pixel values are fed from the image sensor 602 to the image processing system 604 in a particular order, thereby forming a stream of pixel values, e.g. raster scan order in which rows of pixel values are received in turn at the image processing system 604. It would be possible for the pixel values to be passed to the image processing system 604 in a different order, e.g. Boustrophedon order, and it is possible for multiple lines of pixel values to be passed to the image processing system 604 at once, in parallel. However, since the image sensor 602 and the image processing system 604 may be designed by different parties, it is convenient for there to be a presumed, or standard, order in which pixel values are passed from the image sensor 602 to the image processing system 604, and raster scan order is the usual order used. Therefore, in the examples described herein we refer to receiving rows of pixel values in a raster scan order, but it should be apparent that other orders could be used, and that columns of pixel values could be received rather than rows, so where we refer to "rows" of pixel values it is to be understood that we are generally referring to "lines" of pixels values, which could for example be rows or columns.

As described above, the image processing system 604 may, or may not, perform some processing on the pixel values in the processing module(s) 606 before the pixel values are stored in the line store module 608. As described above, the line store module 608 allows pixel values from multiple rows to be provided to the processing module 610 together. For example, the processing module 610 may be arranged to perform a median filtering operation (e.g. to remove impulsive noise) using the median determining unit 612.

Figure 9:
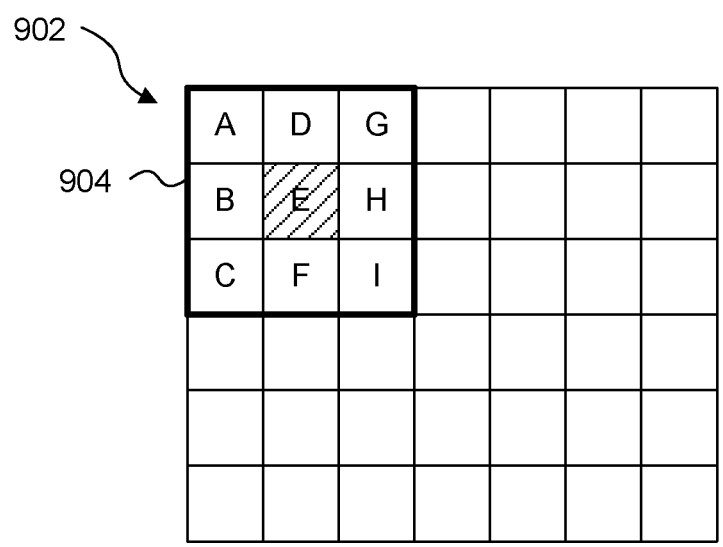
FIG. 9 shows a 2D array of data values, highlighting the data values which will be used for determining the median value for a first data value in the 2D array.

FIG. 9 shows a very simple example in which the stream of pixel values represents a two-dimensional array of pixel values 902 forming an image, wherein the array includes six rows of pixel values, with each row including seven pixel values. Obviously, in more complex examples, there may be many more pixel values within an image, e.g. millions of pixel values arranged such that there are hundreds or thousands of rows and hundreds or thousands of columns of pixels.

For each pixel value in the image, the processing module 610 aims to find the median value within a 3×3 kernel which is, where possible, centred on the particular pixel value in question. For example, the kernel 904 includes pixel values A, B, C, D, E, F, G, H and I and is centred on pixel value E, and can be used to determine a median value for pixel value E. For pixel values on the edge of the array 902 (e.g. pixel values A, B, C, D and G), different kernels could be used, as appropriate. However, rather than altering the kernel for edge cases, the image can be extended, e.g. by reflection of pixel values across the image edge, so that a kernel can be centred on the pixel values on the edge of the image and subsequently processed in the same manner as for non-edge pixel values. The nine pixel values (A to I) are fed from the line store module 608 into the median determining unit 612 of the processing module 610. In the examples described herein, there are references to a median value "for" a particular pixel value, and it is to be understood that this is referring to a median value determined for the position corresponding to the particular pixel value, e.g. a median value determined from the pixel values within a kernel which includes and is typically centred on the particular pixel value.

In step S804 the median determining unit 612 receives data values of the stream (e.g. the subset of nine data values A to I of the stream). The median determining unit 612 operates as described below to determine the median value of the received data values.

In step S805 a subset index subset index i is set such that i=0, for the processing of the first subset.

In step S806 the processing logic 702 determines intermediate data for use in determining the median value of the subset of data values (A to I). The intermediate data is stored in the data storage logic 704. As will become apparent in the description below, the intermediate data stored in the data storage logic 704 can be subsequently used for determining other median values for other data values of the stream. FIG. 10 shows an example of the form that the intermediate data could take.

In the example shown in FIG. 10, the intermediate data is represented as a table. The table shown in FIG. 10 represents a 'compare and count' algorithm in contrast to a 'compare and swap' algorithm as described in the background section above. The intermediate data comprises, for each pairing of data values within the subset, an indication of which of the data values of the pairing is greater. It is not necessary to compare a data value with itself, so the values on the diagonal are shown in FIG. 10 as dashes to represent that no comparison is performed. In other words, references herein to the intermediate data comprising an indication for each pairing of data values may be understood to refer to the intermediate data comprising an indication for each pairing of distinct data values.

In the example shown in FIG. 10, the values of the pixel values are A=2, B=4, C=5, D=13, E=1, F=7, G=9, H=8 and I=12. The table in FIG. 10 has a row for each of the nine pixel values and a column for each of the nine pixel values. For each entry in the table shown in FIG. 10, if the pixel value for the row is greater than the pixel value for the column then a one is stored, whereas if the pixel value for the column is greater than the pixel value for the row then a zero is stored. Therefore, in this example, each of the indications can be represented with a single bit, i.e. they each comprise a one-bit flag.

In step S808 the processing logic 702 of the median determining unit 612 determines a median value for the subset of data values 904 using the intermediate data determined in step S806. FIG. 10 shows the sum of the indications across each of the rows. These summed values indicate, for each respective data value, how many of the other data values in the subset are less than the respective data value. For example, the data value A (2) is greater than one of the other data values in the subset; the data value B (4) is greater than two of the other data values in the subset; the data value C (5) is greater than three of the other data values in the subset; the data value D (13) is greater than eight of the other data values in the subset; the data value E (1) is greater than none of the other data values in the subset; the data value F (7) is greater than four of the other data values in the subset; the data value G (9) is greater than six of the other data values in the subset; the data value H (8) is greater than five of the other data values in the subset; and the data value I (12) is greater than seven of the other data values in the subset. Therefore, step S808 involves determining the result of the sum for each respective data value within the subset based on indications for the pairings involving the respective data value, thereby determining an indication of the number of other data values in the subset that the respective data value is greater than. Step S808 further involves selecting, based on the determined results of the sums, one of the data values in the subset, thereby determining the median value of the data values within the subset. In the example shown in FIG. 10, in which the subset includes nine data values, the median value is the data value which is greater than four of the other data values in the subset, i.e. the data value F, which has a value of 7, is determined to be the median value for the subset 904, as indicated in FIG. 10. Therefore, the median value determined for the pixel value E is 7 (i.e. the median value is given by the pixel value F). In general, if there are n data values in the subset then the median value is the data value which is greater than $$\frac{n-1}{2}$$

of the other values. If n is an odd number then there is a single, middle data value (i.e. the median value), but if n is an even number then there are two data values which could be considered to be in the middle of the sorted data values. Different implementations may determine the median value from these two middle data values in different ways, e.g. the median value could be determined to be the average (i.e. the mean) of the two middle data values, or one of the two middle values could be selected (e.g. the lower of the two, or the higher of the two) to be the median value. However, in practice, even sized kernels are rare because usually a median value is determined for a centre pixel which implies an odd number of rows and an odd number of columns, hence an odd number of pixel values in the median calculations.

In step S810 the median value (i.e. a value of 7) is outputted from the median determining unit 612 to represent the median value determined for the data value E, for use in the image processing system 604. The median value may be used by the processing module 610, used by other processing modules within the image processing system 604, and/or outputted from the image processing system 604.

It is possible that some of the data values within a subset are equal. One mechanism (although others are possible) for handling the case of equal data values is for the processing logic 702 to add a different sub-reference to each data value in the subset. For example, the sub-reference added to each data value in the subset may be dependent upon the position of that data value in the stream. Another way to generate unique sub-references for each of the data values in the subset is for the sub-reference added to each data value in the subset to be based on the row number of the data value in the table shown in FIG. 11, e.g. the sub-reference added to each data value in the subset may be the row number of the data value in the table. Sub-references determined in this way are guaranteed to be unique within a subset, and of minimal size, and are simple to determine by the hardware. For example, an index associated with each of the inputs to the median determining unit 612 (e.g. nine inputs) can be added to the data values received at the respective inputs. In this case, the data values shown in FIG. 10 would become A=2.1, B=4.2, C=5.3, D=13.4, E=1.5, F=7.6, G=9.7, H=8.8 and I=12.9. This ensures that every data value that is compared to form the table (i.e. the intermediate data) is unique. Therefore, the problem of comparing data values that are equal is overcome. In a typical example, the data values may be around 10 to 16 bits, whereas the index will typically be a few bits in size so the overhead in adding the index to each of the data values is not too onerous.

The number of indications which are determined and stored in the table shown in FIG. 10 is given by n(n−1). FIG. 11 shows an optimisation in which only half of the indications shown in FIG. 10 are determined and stored. It is noted that the top right half of the table shown in FIG. 10 is anti-symmetrical with the bottom left half of the table across the diagonal line of dashes. This means that half of the data (e.g. the bottom left half of the indications) shown in FIG. 10 can be inferred from the other half of the data (e.g. the top right half of the indications). Therefore, the number of comparisons which are performed in the example shown in FIG. 11 (i.e. the number of indications stored in the table) is given by $$\frac{n}{2}(n-1).$$

In order to determine the results of the sum for a particular data value (e.g. data value G), the number of zeros in the column for the particular data value (e.g. there are five zeros in the column for data value G) is added to the number of ones in the row for the particular data value (e.g. there is one one in the row for data value G).

In the examples shown in FIGS. 10 and 11 a value of 0 represents that the data value for the row is less than the data value for the column, and a value of 1 represents that the data value for the row is greater than the data value for the column. However, the meaning of 0 and 1 could be swapped in other examples. Furthermore, in an alternative system, a value of −1 could be used rather than 0. This would mean that the data value which is the median value would have a sum of zero because it would be greater than $$\frac{n-1}{2}$$

other data values in the subset and also less than $$\frac{n-1}{2}$$

other data values in the subset. It may be simpler to search for a sum of zero than to search for a sum of $$\frac{n-1}{2}$$

when selecting the median value based on the results of the sums. However, using an indication of zero would mean that signed logic was used so the sum results would be one bit larger than in an unsigned implementation. This downside of increasing the number of bits used may be considered to outweigh the benefit of simplifying the selection of the median value, so an unsigned implementation may be preferred. In general the selection of the median value does not require an active search to be performed by the hardware. A standard hardware operation is a selection operation ("select one from a set of many") which can be used to select the median value from the data values in a subset. For example, if the $n^{th}$ item is to be selected from a list of m data items, then a standard demultiplexer can be implemented. In this case, one hardware solution would be to use tristate logic, with only one of the m inputs enabled. This implementation would be efficient in terms of the size of the hardware (i.e. a small silicon area) and in terms of power consumption.

The determination of the median value using the table shown in FIG. 11 (or FIG. 10) does not involve swapping data between different inputs and therefore it consumes less power than the bubble sort approach described in the background section above. However, the determination of the median value using the table shown in FIG. 11 (or FIG. 10) is still difficult to implement in hardware because of the routing difficulty in connecting every input to every other input for performing the comparisons to determine all of the indications in the table shown in FIG. 11 (or FIG. 10). As described above, in the example shown in FIG. 11, the number of comparisons that are performed is given by $$\frac{n}{2}(n-1),$$

and each one of these comparisons is performed by a respective comparator coupled to a respective pairing of the inputs. This may be possible for n=9, but as n increases (e.g. for n=25 or n=49) it this becomes very difficult to implement and the number of comparisons that are performed increases quadratically with the number of inputs, so the latency and power consumption of the median determining unit may be a problem if a table of indications (e.g. as shown in FIG. 11) was determined independently for determining each median value.

However, according to the examples described herein, at least some of the indications determined for determining one median value may be used for determining one or more subsequent median values. In other words, because the image processing system 604 is determining a median value for each data value within a stream of data values the subsets of data values which are considered for each median determination partially overlap with each other.

Figures 12, 13:
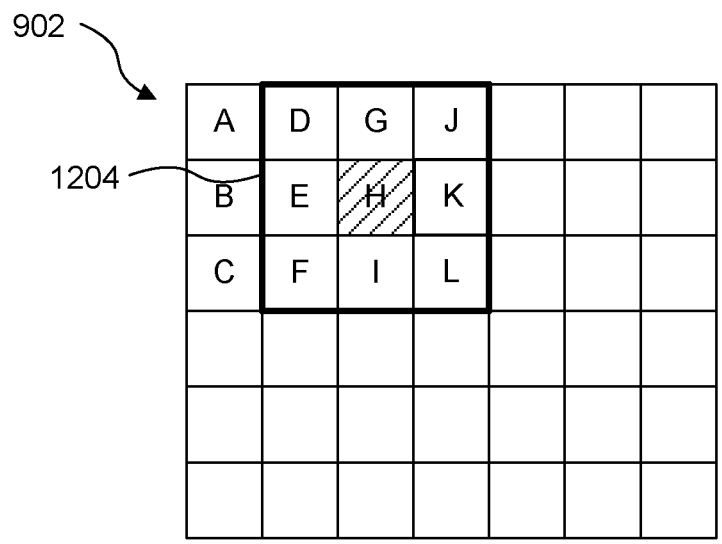
FIG. 12 shows a 2D array of data values, highlighting the data values which will be used for determining the median value for a second data value in the 2D array.
FIG. 13 shows an example of intermediate data which can be used for determining the median value for the second data value in the 2D array.

For example, FIG. 12 shows the 2D array of pixel values 902. Having determined the median value for the pixel value E, the processing module 610 now uses the median determining unit 612 to determine a median value for the pixel value H. So the median determining unit 612 determines the median value of the pixel values within the kernel 1204, which includes pixel values D, E, F, G, H, I, J, K and L. It can be appreciated that the kernel 1204 partially overlaps with the kernel 904. This means that the current subset of data values from which a median value is being determined at least partially overlaps with the previous subset of data values from which a median value is determined. The data values of a subset may be referred to as the data values within a "window" of the data stream. Each of the subsets of data values within the stream of data values represents a contiguous block of data values within the 2D array 902.

In step S811, the subset index i is incremented, such that on the first iteration step S811 involves setting the subset index to 1.

In step S812 the intermediate data (e.g. the table shown in FIG. 11) stored for the previous subset (i.e. the $(i-1)^{th}$ subset) is retrieved from the data storage logic 704.

In step S814 the retrieved intermediate data for the previous subset (i.e. the $(i-1)^{th}$ subset) of data values is used to determine intermediate data for use in determining a median value of the current subset (i.e. the $i^{th}$ subset) of data values. The result of step S814 is shown in FIG. 13. It can be seen in FIG. 13 (and by comparing it to FIG. 11) that the data values J, K and L have taken the place of the data values A, B and C in the table. In this example, the new data values have values of J=10, K=2 and L=11. The comparisons between a pair of data values which were both in the previous subset (i.e. the $(i-1)^{th}$ subset) do not need to be performed again, and the indications of the results of these comparisons are shown with hashing in FIG. 13. It can be seen that these hashed indications are the same as the corresponding indications in the table shown in FIG. 11. The table shown in FIG. 13 includes 36 indications (i.e.

$$\frac{n}{2}(n-1) = 36,$$

wnen n=9). 15 of these indications have already been determined for the previous subset (i.e. the hashed indications), and 21 of the indications have not already been determined because they are the result of a comparison involving one or more of the data values J, K and L (i.e. the data value of the current subset which were not included in the previous subset). So step S814 involves performing 21 comparisons of pairs of data values of the current subset in order to determine the unhashed indications shown in FIG. 13. Therefore, in this example, the processing logic 702 comprises 21 comparison modules 706 configured to determine the 21 indications for pairings involving one or more data values of the current subset which do not overlap with the previous subset.

As an aside, and as described in more detail below with reference to FIGS. 14a to 15b, in some data processing systems, e.g. audio processing systems, the stream of data values may represent a one-dimensional (1D) array of data values. As an example, the process may take the intermediate data from $1^{st}$ $2^{nd}$ $3^{rd}$ $4^{th}$ $5^{th}$ $6^{th}$ $7^{th}$ 8 and $9^{th}$ data values on one iteration and then in the next iteration substitute the $10^{th}$ data value for the $1^{st}$ data value in the subset of data values from which a median value is selected. In 1D examples, the complexity is reduced from $\sim n^2$ to $\sim n$, and for 9 data values just eight comparisons would be performed on each iteration. All the comparisons can be done in parallel, and the changes to each of the row sums could also be done in parallel. Therefore, the intermediate results can be produced very quickly.

Returning to the 2D process shown in FIGS. 9 to 13, in some examples, rather than substituting multiple (e.g. three) values at the same time, the updating of the table shown in FIG. 11 to arrive at the table shown in FIG. 13 could be implemented in multiple (e.g. three) phases, e.g. by substituting one data value at a time. In other words, if more than one data value of the current subset does not overlap with the previous subset, then the indications (e.g. as shown in FIG. 13) for the pairings involving one or more data values of the current subset which do not overlap with the previous subset may be determined in multiple phases. In each phase, a single one of the data values of the current subset which does not overlap with the previous subset replaces one of the data values of the previous subset which does not overlap with the current subset. For example, starting from the table shown in FIG. 11, in a first phase, data value J may substitute data value A to produce a table of intermediate data values with respective rows for data values J, B, C, D, E, F, G, H and I. Then in a second phase, data value K may substitute data value B to produce a table of intermediate data values with respective rows for data values J, K, C, D, E, F, G, H and I. Then in a third phase, data value L may substitute data value C to produce a table of intermediate data values with respective rows for data values J, K, L, D, E, F, G, H and I, as shown in FIG. 13. Dividing the processing into multiple (e.g. three) phases reduces the number of comparisons that are performed in a single phase. The number of comparison units included in the system may be the same as the number of comparisons that are performed in a single phase. In general, the number of phases may be equal to the number of data values of the current subset which do not overlap with the previous subset. Therefore, when processing in a raster scan order, the number of phases may be equal to the number of rows of data values in a subset. By reducing the number of comparisons that are performed in a single phase, the complexity of the layout can be massively reduced. This approach is particularly useful as it results in a small, high speed hardware unit that may be re-used as required according to the performance and area requirements of the processing logic 702.

In step S816 the intermediate data (e.g. the table shown in FIG. 13) for the current subset (i.e. the $i^{th}$ subset) is stored in the data storage logic 704.

In step S818 the processing logic 702 determines a median value of the data values within the current subset (i.e. the $i^{th}$ subset) using the intermediate data determined in step S814 for the current subset (i.e. the $i^{th}$ subset). Step S818 is similar to step S808 in that it involves determining the results of the sums for each of the data values in the current subset and then determining the median value by selecting one of the data values in the subset based on the determined results of the sums. In the example shown in FIG. 13, the data value G, which has a value of nine, has a sum of four, so the median value for the current subset is determined to be nine. Therefore, the median value determined for the pixel value H is 9 (i.e. the median value is given by the pixel value G).

In step S820 the median value (e.g. a value of 9) determined for the $i^{th}$ subset is outputted from the median determining unit 612 (e.g. to represent the median value determined for the data value H), for use in the image processing system 604. The median value may be used by the processing module 610, used by other processing modules within the image processing system 604, and/or outputted from the image processing system 604.

In step S822 the processing logic 702 determines whether there are any more subsets of data values to process, and if there are, then the method passes back to step S811 in which the subset index i is incremented and the method repeats by performing steps S812 to S820 for the next subset. If it is determined in step S822 that there are no more subsets of data values to process then the method ends in step S824.

As mentioned above, in order to determine median values for pixels on or near an edge of an image, the kernel which is used may be adapted. The treatment of edge pixels can vary in different implementations.

Figure 8:
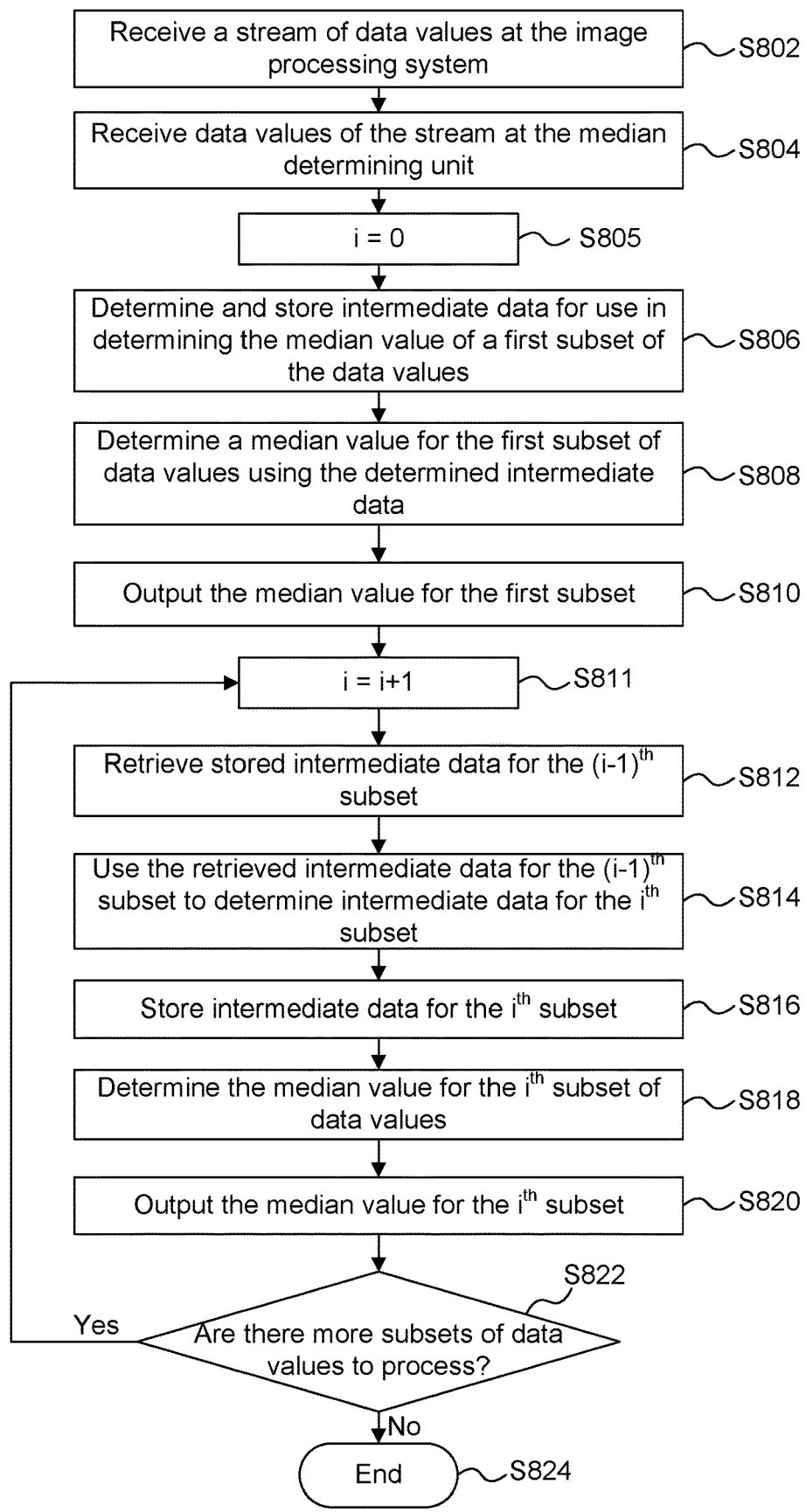
FIG. 8 is a flow chart for a method of determining median values in a data processing system.

In the method shown in FIG. 8 each median value is outputted as it has been determined (e.g. in steps S810 and S820). It would be possible to output groups of median values in batches when a whole batch of median values has been determined. For example, when median values for a row of pixel values have been determined then all of the median values for that row could be outputted together. Furthermore, the method could wait until all of the median values have been determined for all of the pixels within an image before any of them are outputted.

In the example described above, in step S814, the processing logic 702 replaces the indications for the pairings involving one or more data values of the $(i-1)^{th}$ subset which do not overlap with the $i^{th}$ subset (i.e. involving data values A, B and/or C in the example shown in FIGS. 11 and 13) with the indications determined by the comparison modules 706 for the pairings involving one or more data values of the $i^{th}$ subset which do not overlap with the $(i-1)^{th}$ subset (i.e. involving data values J, K and/or L in the example shown in FIGS. 11 and 13). This allows the previous indications (i.e. the hashed indications in FIG. 13) which do not change to stay where they are in the table. However, in a different implementation, the indications for the comparisons involving only data values which overlap with both subsets i and (i-1) (i.e. indications for comparisons involving two of data values D, E, F, G, H and I in the example shown in FIGS. 11 and 13) could be shifted up to fill the gap left by indications for comparisons involving the old data values A, B and/or C, and then the new indications for comparisons involving the new data values J, K and/or L could be placed at the bottom of the table. This might be a more intuitive way to implement the table because data values are represented in the table in the order in which they appear in the stream, but this implementation involves more moving of data between iterations of the method so it may involve more processing, and therefore may consume more power and may add to the latency of the process. As explained above, the replacement of the indications may be performed in multiple phases, such that single data value replacements are implemented in each of the phases, so the number of comparisons that are performed in each phase is reduced. This simplifies the routing problem and reduces the number of comparison units that are implemented, thereby reducing the size and complexity of the hardware.

In the above description, the first median calculation (in steps S806 and S808) is performed for data value E, but this is just to simplify the description of the method, because the data value E is the first data value in the stream on which a 3×3 kernel can be centred without extending the image, e.g. by reflection across the image edge. In a real system, median values will most likely be determined for each data value in the stream in turn, i.e. when the data values are received in raster scan order, then the top row of data values is processed first, from left to right, and then the next row of data values is processed, and so on. Therefore, the first data value for which a median value is determined is likely to be data value A, then D, then G, then J, etc. across the top row of data values in the example shown in FIGS. 9 and 12. It may be the case that for the first data value in each row, steps S806 and S808 are performed to determine the indications in the table without reusing previously determined indications, and then for subsequent data values in a row the steps S812 to S818 are performed to determine the indications in the table based on previously determined indications.

In the simple examples shown in FIGS. 9 to 13, the subsets of data values represent 3×3 blocks of data values with the 2D array 902. In other examples, the subsets of data values may be other shapes or sizes, e.g. the subsets of data values may represent one of: 5×5 blocks of data values, 7×7 blocks of data values, 3×5 blocks of data values, 5×7 blocks of data values, 7×9 blocks of data values or 9×9 blocks of data values to give just some examples. In all of these examples, an odd number of data values are included in each of the subsets, but it would be possible for a subset of data value to include an even number of data values. As described above, when n is an even number there will be two middle data values, and the median value can be determined from these two middle data values, (e.g. as the lower of the two, the higher of the two or the mean of the two middle data values). Furthermore, the data value for which a subset of data values is passed to the median determining unit 612 may be in the centre of the subset of data values (e.g. the data value E is in the centre of the kernel 904, and the data value H is in the centre of the kernel 1204). However, this is not always the case. For example, near to the edges of the array, the data value for which a subset of data values is passed to the median determining unit 612 might not be in the centre of the subset of data values.

In some examples, all of the subsets might be the same size and shape, but in other examples some of the subsets may differ in size and/or shape. For example, subsets for determining the median value for data values on or near an edge of the 2D array may be smaller than subsets for determining the median value for data values which are far from the edges of the 2D array.

It can be seen that the rolling window approach to determining median values for a stream of data values, whereby some of the intermediate data determined for one subset of data values can be used for a subsequent subset of data values, improves the efficiency of the median determining unit 612 by reducing the number of comparisons that are performed (compared to determining each median value separately). As the subsets of data values increase in size the amount of overlap between consecutive subsets which are processed increases, such that the efficiency gains achieved with the approach described herein increase. In the example described above, with a 3×3 block of data values, comparisons are performed for determining 21 of the 36 (i.e. 58%) indications shown in FIG. 13 for each of a plurality of subsets following a first subset. With a 7×7 block of data values, comparisons are performed for determining 315 of 1176 (i.e. 27%) indications for each subset following a first subset. If the updating of the table is done in multiple phases (e.g. seven phases), each phase would include 48 comparisons. Reducing the number of comparisons that are performed reduces the processing power and time of determining a median value and also reduces the amount of hardware (i.e. the number of comparison modules) that is implemented in the processing logic of the median determining unit.

It may be beneficial to use subsets which represent blocks of pixel values which are wider than they are tall. Since the line store module 608 stores rows of data values, (e.g. as they arrive in raster scan order), a reduction in the number of rows means that the line store module 608 can have a reduced size, and a delay incurred in waiting for the line store module 608 to receive enough pixel values for the median determining unit 612 to process pixel values can be reduced. Whilst it may be advantageous to reduce the number of rows in the subsets for the reasons given above, the same is not true for reducing the number of columns in the subsets (when the data values are received in rows, e.g. in raster scan order or Boustrophedon order), so it can be beneficial to have subsets which have more columns than rows (i.e. they are wider than they are tall). This allows the subsets to retain a large overall size, whilst reducing the number of rows in the subsets. The size and shape of the subsets may depend on the use for which the median values are being determined (i.e. the function of the processing module 610).

In the examples described above, the pixel values originate from the image sensor 602. However, the median determining unit 612 can operate on a stream of pixel values, irrespective of where the pixel values originated. For example, pixel values of an image could be generated by a graphics processing unit (rather than being captured by an image sensor), and the median determining unit 612 could be used to determine median values as part of the processing of the pixel values within the graphics processing unit.

The examples given above are described in terms of an image processing system 604 processing pixel values. The same principles can apply to other types of data processing system, e.g. where data values are not pixel values.

FIG. 14*a* illustrates an example in which the stream of data values 1402 represents a one-dimensional array (i.e. a sequence) of data values. In this case each of the subsets of data values within the stream represents a contiguous block of data values within the one-dimensional array. For example, the kernel 1404 represents a subset of data values (including data values A, B, C, D, E, F and G) which can be used for determining a median value for the data value D. In this case the subset 1404 includes seven data values.

The method shown in FIG. 8 can be used to determine median values for the data values within the 1D array 1402. FIG. 14*b* shows a table of indications determined for the subset 1404 in step S806. In the example shown in FIG. 14*b* the data values are A=6, B=2, C=5, D=7, E=1, F=3 and G=4. Following the process described above, in step S808 the value G (i.e. a value of 4) is determined to be the median value for the subset 1404 because its sum has a value of 3 (i.e.

$$\frac{n-1}{2} = 3$$

when n=7).

Then the median determining unit 612 determines a median value for the next data value (data value E) in the stream by finding the median of the data values within the kernel 1504, as shown in FIG. 15*a*. The kernel 1504 represents a subset of the data values including the data values B, C, D, E, F, G and H.

In step S812 the processing logic 702 retrieves, from the data storage logic 704, the intermediate data (i.e. the table shown in FIG. 14*b*) stored in step S806. As shown in FIG. 15*b*, the indications in the bottom six rows of the table (which are shown with hashing) will not need to be updated compared to the table shown in FIG. 14*b*. However, the top row of the table is updated to include indications for the new data value (data value H) in place of the indications for the old data value (data value A). In the example shown in FIG. 15*b* the data value H has a value of 8. The results of the sums can then be determined in step S818, and the median can be selected by finding the data value which has a sum equal to 3. Therefore in step S818 the value G (i.e. a value of 4) is determined to be the median value for the subset 1504. The process repeats for each of a plurality of data values in the stream.

It can be seen in this example that six comparisons are performed to determine the table shown in FIG. 15*b*, so just six comparison modules 706 are used in the processing logic 702 for this purpose. Fifteen results of the comparisons are carried over from the previous subset (i.e. there are fifteen hashed indications in FIG. 15*b*), so only 6 out of 21 indications (29%) of the indications in the table shown in FIG. 15*b* are determined on each iteration for a respective subset.

A 1D stream of data values could be used if the data processing system is an audio processing system and the data values are audio samples of an audio signal. For example, the audio signal could be received and sampled at a microphone and the audio samples can be passed to the audio processing system. The audio processing system may perform some processing functions (some of which may implement a median determining unit as described herein) on the audio samples before outputting the processing audio signal, e.g. via a speaker.

In another example, a 1D stream of data values could be used if the data processing system is a signal processing system and the data values are signal samples of a transmitted signal. For example, the signal could be received over a wired or wireless channel, at a device in which the signal processing system is implemented. The device can sample the received signal and then the signal processing system may perform some processing functions (some of which may implement a median determining unit as described herein) on the received signal samples in order to extract the data from the received signal.

In the examples described above, the intermediate data which is stored in the data storage logic 704 takes the form of the indications in the tables shown in FIGS. 11 and 13. In other examples, the intermediate data could take other forms. For example, in some examples the intermediate data for a subset of data values may comprise, for each of the data values in the subset, an index value indicating a sorted position of the data value within the subset. For example, the results of the sums shown in FIGS. 11 and 13 could be stored as indices for the data values. So, taking FIG. 11 as an example, rather than storing all of the indications in the table, just the results of the sums are stored. The results of the sums can be determined in the same way as described above. Therefore, in the example shown in FIG. 11, an index of 1 is stored for data value A, an index of 2 is stored for data value B, an index of 3 is stored for data value C, an index of 8 is stored for data value D, an index of 0 is stored for data value E, an index of 4 is stored for data value F, an index of 6 is stored for data value G, an index of 5 is stored for data value H, and an index of 7 is stored for data value I. Just storing the indices (i.e. the results of the sums) rather than the indications in the table reduces the amount of intermediate data that is stored in the data storage logic 704 between iterations of the method. Since the index values are the same as the results of the sums described above, the processing logic can determine a median value of the data values within a subset by selecting one of the data values in the subset based on the index values. Although this example reduces the amount of intermediate data that is stored in the data storage logic 704 between iterations, in the example described below some indications (i.e. comparisons) need to be re-computed in a current iteration that have been computed in the previous iteration; whereas in the examples described above with reference to FIGS. 10 to 15b these indications would not need to be recomputed because they are stored in the intermediate data. So, there is a trade-off between reducing the amount of intermediate data that is stored between iterations and increasing the number of comparisons that are performed in each iteration.

For subsequent subsets in this example, the index values of a previous subset can be used to determine index values for a current subset. In order to do this, the processing logic can retrieve the intermediate data (i.e. the index values) stored for the previous subset and use the retrieved index values to determine index is values for a current subset, e.g. as described below.

Index values of one or more data values of the previous subset which overlap with the current subset are identified. For each of one or more data values of the current subset which do overlap with the previous subset, a determination is made as to whether or not to increment or decrement the index value for the data value based on: (i) a comparison of the data value with the one or more data values of the previous subset which do not overlap with the current subset, and (ii) a comparison of the data value with the one or more data values of the current subset which do not overlap with the previous subset. One or more index values are identified to be assigned to the one or more data values of the current subset which do not overlap with the previous subset by finding gaps in the sequence of index values of the data values in the current subset, such that the index values in the current subset form a contiguous sequence.

For example, when the processing logic determines a median value for the data value H shown in FIG. 12, it is finding a median value of the data values in the subset 1204, which includes data values D, E, F, G, H, I, J, K and L. The processing logic can identify the index values of the data values of the previous subset 904, i.e. data values A, B, C, D, E, F, G, H and I. There are three new data values (J, K and L) in the current subset which replace three old data values (A, B and C) in the previous subset, and this can be done in three phases. FIG. 16a illustrates a first phase, in which the data value J replaces the data value A. FIG. 16a shows the rows of indications for data values A and J. The identified index values (i.e. the previous sums) are shown in FIGS. 16a as 2, 3, 8, 0, 4, 6, 5 and 7 for data values B, C, D, E, F, G, H and I respectively. It can be seen that these sums match those shown in FIG. 11.

For each of the data values of the current subset 1204 which do not overlap with the previous subset 904, the processing logic determines an index value for the data value by comparing the data value to the other data values in the current subset 1204. In general, if R denotes a data value being retired (e.g. data value A in the first phase shown in FIG. 16a), N denotes a new data value of the current is subset (e.g. data value J in the first phase shown in FIG. 16a), and X denotes each respective existing data value that is being kept (e.g. data values B, C, D, E, F, G, H and I in the first phase shown in FIG. 16a), then the sum values of the existing data values (X) can be updated as follows:
(i) if X<R and X<N, then the sum for X does not change;
(ii) if X>R and X>N, then the sum for X does not change;
(iii) if R<X<N, then decrement the sum for X; and
(iv) if N<X<R, then increment the sum for X.

In this example, the data value J has a value of 10, and when it is compared with the values of data values B, C, D, E, F, G, H and I, the indications of the comparisons between each of the existing data values (B to I) with data value A and with data value J are shown in the first two rows of the table in FIG. 16a. According to the rules given above, the sums for data values B, C, F, G and H are decremented, whilst the sums for data values D, E and I do not change. Therefore the updated sums (i.e. the updated index values) for data values B, C, D, E, F, G, H and I are 1, 2, 8, 0, 3, 5, 4 and 7 respectively. There is a gap in the index value sequence (an index value of 6), so the new data value J is given the index value 6, as shown in FIG. 16a.

FIG. 16b illustrates a second phase, in which the data value K replaces the data value B. FIG. 16b shows the rows of indications for data values B and K. The identified index values (i.e. the previous sums) are shown in FIGS. 16b as 6, 2, 8, 0, 3, 5, 4 and 7 for data values J, C, D, E, F, G, H and I respectively. It can be seen that these sums match those shown as updated sums in FIG. 16a. In this example, the data value K has a value of 2, and when it is compared with the values of data values J, C, D, E, F, G, H and I, the indications of the comparisons between each of the existing data values (J and C to I) with data value B and with data value K are shown in the first two rows of the table in FIG. 16b. According to the rules given above, the sums for all of the existing data values J, C, D, E, F, G, H and I are not changed. Therefore the updated sums (i.e. the updated index values) for data values J, C, D, E, F, G, H and I are 6, 2, 8, 0, 3, 5, 4 and 7 respectively. There is a gap in the index value sequence (an index value of 1), so the new data value K is given the index value 1, as shown in FIG. 16b.

FIG. 16c illustrates a third phase, in which the data value L replaces the data value C. FIG. 16c shows the rows of indications for data values C and L. The identified index values (i.e. the previous sums) are shown in FIGS. 16c as 6, 1, 8, 0, 3, 5, 4 and 7 for data values J, K, D, E, F, G, H and I respectively. It can be seen that these sums match those shown as updated sums in FIG. 16b. In this example, the data value L has a value of 11, and when it is compared with the values of data values J, K, D, E, F, G, H and I, the indications of the comparisons between each of the existing data values (J, K and D to I) with data value C and with data value L are shown in the first two rows of the table in FIG. 16c. According to the rules given above, the sums for data values J, F, G and H are decremented, whilst the sums for data values K, D, E and I do not change. Therefore the updated sums (i.e. the updated index values) for data values J, K, D, E, F, G, H and I are 5, 1, 8, 0, 2, 4, 3 and 7 respectively. There is a gap in the index value sequence (an index value of 6), so the new data value L is given the index value 6, as shown in FIG. 16c. It can be seen that the updated sums shown in FIG. 16c match those shown in FIG. 13. The median value is the data value with an index value ("updated sum") of 4 in the example shown in FIG. 16c, so this is data value G (which has a value of 9) in this example.

It should be apparent that different examples can use different types of intermediate data for determining median values. The examples described herein involve determining median values in a rolling manner for different data values from a stream of data values, such that the intermediate data used for determining the median value of a first subset of the received data values is stored and can be used for determining the median value of a second subset of the received data values which partially overlaps with the first subset. This means that at least some of the processing involved in determining a median value can be used for determining a plurality of median values for a respective plurality of data values of a stream of data values. Therefore, each median value is not calculated independently from scratch, so the amount of processing (and therefore the size of the processing hardware) can be reduced relative to a system in which each median value is calculated independently.

The median determining units described herein are shown in FIGS. 6 and 7 as comprising a number of functional blocks. This is schematic only and is not intended to define a strict division between different logic elements of such entities. Each functional block may be provided in any suitable manner. It is to be understood that intermediate values described herein as being formed by a median determining unit need not be physically generated by the median determining unit at any point and may merely represent logical values which conveniently describe the processing performed by the median determining unit between its input and output.

The median determining units described herein may be embodied in hardware on an integrated circuit. The median determining units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code is expressed in a machine language, an interpreted language or a scripting language. Executable code includes binary code, machine code, bytecode, code defining an integrated circuit (such as a hardware description language or netlist), and code expressed in a programming language code such as C, Java (RTM) or OpenCL (RTM). Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a median determining unit or data processing system configured to perform any of the methods described herein, or to manufacture a median determining unit or data processing system comprising any apparatus described herein. An integrated circuit definition dataset may be, for example, an integrated circuit description.

Therefore, there may be provided a method of manufacturing, at an integrated circuit manufacturing system, a median determining unit or data processing system as described herein. Furthermore, there may be provided an integrated circuit definition dataset that, when processed in an integrated circuit manufacturing system, causes the method of manufacturing a median determining unit or data processing system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a median determining unit will now be described with respect to FIG. 17.

Figure 17:
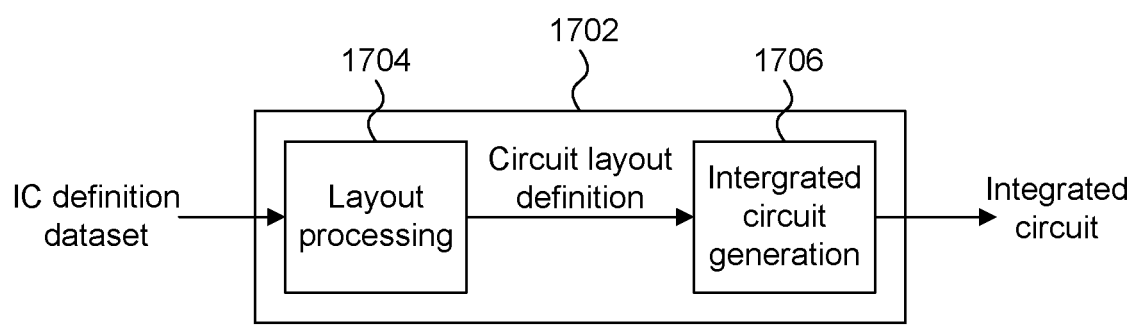
FIG. 17 shows an integrated circuit manufacturing system for generating an integrated circuit embodying a median determining unit.

FIG. 17 shows an example of an integrated circuit (IC) manufacturing system 1702 which is configured to manufacture a median determining unit as described in any of the examples herein. In particular, the IC manufacturing system 1702 comprises a layout processing system 1704 and an integrated circuit generation system 1706. The IC manufacturing system 1702 is configured to receive an IC definition dataset (e.g. defining a median determining unit as described in any of the examples herein), process the IC definition dataset, and generate an IC according to the IC definition dataset (e.g. which embodies a median determining unit as described in any of the examples herein). The processing of the IC definition dataset configures the IC manufacturing system 1702 to manufacture an integrated circuit embodying a median determining unit as described in any of the examples herein.

The layout processing system 1704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1704 has determined the circuit layout it may output a circuit layout definition to the IC generation system 1706. A circuit layout definition may be, for example, a circuit layout description.

The IC generation system 1706 generates an IC according to the circuit layout definition, as is known in the art. For example, the IC generation system 1706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1706 may be in the form of computer-readable code which the IC generation system 1706 can use to form a suitable mask for use in generating an IC.

The different processes performed by the IC manufacturing system 1702 may be implemented all in one location, e.g. by one party. Alternatively, the IC manufacturing system 1702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a median determining unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 17 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 17, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A data processing system configured to process a stream of data values, the data processing system comprising a median determining unit which is configured to receive data values of the stream and determine median values for use in the data processing system, wherein the median determining unit comprises:

processing logic implemented in hardware and configured to determine a median value of a first subset of the received data values of the stream; and data storage logic implemented in hardware and configured to store first intermediate data used for determining the median value of the first subset of the received data values;

wherein the processing logic is further configured to: (i) use the stored first intermediate data to determine second intermediate data, and (ii) use the second intermediate data to determine a median value of a second subset of the received data values of the stream, wherein the second subset of data values at least partially overlaps with the first subset of data values;

wherein the median determining unit is further configured to output the determined median values for use in the data processing system, and wherein the intermediate data for a subset of data values comprises, for each pairing of data values within the subset, an indication of which of the data values of the pairing is greater.

2. The data processing system of claim 1 wherein the data storage logic is configured to store the second intermediate data for use in determining a median value of a further subset of the received data values, wherein the further subset of data values at least partially overlaps with the second subset of data values.

3. The data processing system of claim 1, wherein the processing logic comprises a plurality of comparison modules configured to determine a respective plurality of the indications for pairings involving one or more data values of the current subset which do not overlap with the previous subset.

4. The data processing system of claim 3, wherein the processing logic is configured to replace the indications for pairings involving one or more data values of the previous subset which do not overlap with the current subset of data values with the plurality of indications determined by the plurality of comparison modules for the pairings involving one or more data values of the current subset which do not overlap with the previous subset.

5. The data processing system of claim 3, wherein the processing logic is configured to, if more than one data value of the current subset does not overlap with the previous subset, determine the plurality of indications in multiple phases, wherein in each of the phases, a single one of the data values of the current subset which does not overlap with the previous subset replaces one of the data values of the previous subset which does not overlap with the current subset.

6. The data processing system of claim 1, wherein the processing logic is configured to add a different sub-reference to each data value in the subset.

7. The data processing system of claim 1, wherein the indications each comprise a single-bit flag.

8. The data processing system of claim 1, wherein the processing logic is configured to determine a median value of the data values within a subset of data values by:

for each respective data value within the subset, determining the result of a sum based on indications for the pairings involving the respective data value to thereby determine an indication of the number of other data values in the subset that the respective data value is greater than; and selecting, based on the determined results of the sums, one of the data values in the subset, thereby determining the median value of the data values within the subset.

9. The data processing system of claim 1, wherein the stream of data values represents a two-dimensional array of data values, wherein each of the subsets of data values within the stream of data values represents a contiguous block of data values within the two-dimensional array.

10. The data processing system of claim 9, wherein the data processing system is an image processing system, and wherein the data values are pixel values.

11. The data processing system of claim 10, wherein the data processing system is configured to receive lines of pixel values, wherein the data processing system comprises a line store module configured to store rows of pixel values such that the subsets of pixel values can span over more than one row, wherein the data processing system is configured to receive the stream of pixel values according to a raster scan order, and wherein the subsets of pixel values represent blocks of pixel values within the two dimensional array which are wider than they are tall.

12. The data processing system of claim 1, wherein the stream of data values represents a one-dimensional array of data values, wherein each of the subsets of data values within the stream of data values represents a contiguous block of data values within the one-dimensional array, and wherein:

the data processing system is an audio processing system, and the data values are audio samples of an audio signal; or the data processing system is a signal processing system, and the data values are signal samples of a transmitted signal.

13. The data processing system of claim 1, wherein the processing logic is implemented in dedicated hardware, and wherein the data processing system is configured to receive, process and output the stream of data values in real-time.

14. A computer-implemented method of determining median values in a data processing system which processes a stream of data values, the method comprising performing the following operations in hardware implemented in the data processing system:

receiving data values of the stream;

determining, by processing logic of a median determining unit, a median value of a first subset of the received data values of the stream;

storing first intermediate data used for determining the median value of the first subset of the received data values in data storage logic implemented in hardware;

using the stored intermediate data to determine second intermediate data;

using the second intermediate data to determine a median value of a second subset of the received data values of the stream, wherein the second subset of data values at least partially overlaps with the first subset of data values;

outputting the determined median values from the median determining unit for use in the data processing system, wherein the intermediate data for a subset of data values comprises, for each pairing of data values within the subset, an indication of which of the data values of the pairing is greater.

15. The method of claim 14 further comprising storing the second intermediate data for use in determining a median value of a further subset of the received data values, wherein the further subset of data values at least partially overlaps with the second subset of data values.

16. The method of claim 14 wherein a median value of the data values within a subset of data values is determined by:

for each respective data value within the subset, determining the result of a sum based on indications for the pairings involving the respective data value to thereby determine an indication of the number of other data values in the subset that the respective data value is greater than; and selecting, based on the determined results of the sums, one of the data values in the subset to thereby determine the median value of the data values within the subset.

17. A data processing system configured to process a stream of data values, the data processing system comprising a median determining unit which is configured to receive data values of the stream and determine median values for use in the data processing system, wherein the median determining unit comprises:
processing logic implemented in hardware and configured to determine a median value of a first subset of the received data values of the stream; and
data storage logic implemented in hardware and configured to store first intermediate data used for determining the median value of the first subset of the received data values;
wherein the processing logic is further configured to: (i) use the stored first intermediate data to determine second intermediate data, and (ii) use the second intermediate data to determine a median value of a second subset of the received data values of the stream, wherein the second subset of data values at least partially overlaps with the first subset of data values;
wherein the median determining unit is further configured to output the determined median values for use in the data processing system, and
wherein the intermediate data for a subset of data values comprises, for each of the data values in the subset, an index value indicating a sorted position of the data value within the subset, wherein the processing logic is configured to determine a median value of the data values within a subset of data values by selecting one of the data values in the subset based on the index values.

18. The data processing system of claim 17, wherein the processing logic is configured to use the retrieved intermediate data for the previous subset of data values to determine intermediate data for use in determining a median value of the current subset of received data values of the stream by:
identifying index values of one or more data values of the previous subset which overlap with the current subset of data values;
for each of one or more data values of the current subset which overlap with the previous subset, determining whether or not to increment or decrement the index value for the data value based on: (i) a comparison of the data value with the one or more data values of the previous subset which do not overlap with the current subset, and (ii) a comparison of the data value with the one or more data values of the current subset which do not overlap with the previous subset; and
identifying one or more index values to be assigned to the one or more data values of the current subset which do not overlap with the previous subset by finding gaps in the sequence of index values of the data values in the current subset, such that the index values in the current subset form a contiguous sequence.

19. The data processing system of claim 17, wherein the data processing system is an image processing system, and wherein the stream of data values represents a two-dimensional array of pixel values, wherein each of the subsets of pixel values within the stream of pixel values represents a contiguous block of pixel values within the two-dimensional array.

20. The data processing system of claim 19, wherein the data processing system is configured to receive lines of pixel values, wherein the data processing system comprises a line store module configured to store rows of pixel values such that the subsets of pixel values can span over more than one row, wherein the data processing system is configured to receive the stream of pixel values according to a raster scan order, and wherein the subsets of pixel values represent blocks of pixel values within the two dimensional array which are wider than they are tall.

* * * * *